(12) United States Patent
Hegler et al.

(10) Patent No.: US 6,323,425 B1
(45) Date of Patent: Nov. 27, 2001

(54) METHOD OF PRODUCING A ONE-PIECE CORRUGATED JACKET PIPE FROM THERMOPLASTIC AND METHOD OF INSERTING AT LEAST ONE ELECTRIC LINE INTO SUCH A CORRUGATED JACKET PIPE

(76) Inventors: Ralph Peter Hegler, Schillerstrasse 7, D-97688 Bad Kissingen; Maximilian Groebmair, Linden/Baiernrainer Weg 10, D-83623 Dietramszell, both of (DE)

(*) Notice: Subject to any disclaimer, the term of this patent is extended or adjusted under 35 U.S.C. 154(b) by 0 days.

(21) Appl. No.: 09/668,234

(22) Filed: Sep. 22, 2000

Related U.S. Application Data

(63) Continuation of application No. 09/489,616, filed on Jan. 24, 2000, now abandoned.

(30) Foreign Application Priority Data

Feb. 6, 1999 (DE) ............................................. 199 04 977

(51) Int. Cl.[7] .................................................... H02G 3/04
(52) U.S. Cl. ........................ 174/68.3; 174/69; 174/102 D
(58) Field of Search ................................. 174/68.3, 68.1, 174/69, 86, 89, 98, 99 R, 102 D, 110 N, 110 PM, 126.3

(56) References Cited

U.S. PATENT DOCUMENTS

| 3,892,912 | * | 7/1975 | Hauck | 174/68.3 |
| 4,970,351 | * | 11/1990 | Kirlin | 174/68.3 |
| 6,034,329 | * | 3/2000 | Kawamura | 174/102 R |
| 6,051,789 | * | 4/2000 | Kato | 174/68.3 |
| 6,164,338 | * | 12/2000 | Holzer et al. | 138/106 |

FOREIGN PATENT DOCUMENTS

| 3405552A1 | 8/1985 | (DE) . |
| 3640226A1 | 6/1988 | (DE) . |
| 4410706A1 | 10/1995 | (DE) . |
| 19705761A1 | 8/1998 | (DE) . |
| 0268869B1 | 3/1994 | (EP) . |

\* cited by examiner

*Primary Examiner*—Dean A. Reichard
*Assistant Examiner*—W. David Walkenhorst
(74) *Attorney, Agent, or Firm*—Robert F. I. Conte; Lee, Mann, Smith, McWilliams, Sweeney & Ohlson

(57) ABSTRACT

For the production of a one-piece corrugated jacket pipe of thermoplastic, the corrugated jacket pipe is formed to have corrugated partial sections which are deformed such that the direction in which they lie one above the other radially to the axis of the corrugated pipe is reverse to the direction in the locked condition after insertion of electric lines.

2 Claims, 5 Drawing Sheets

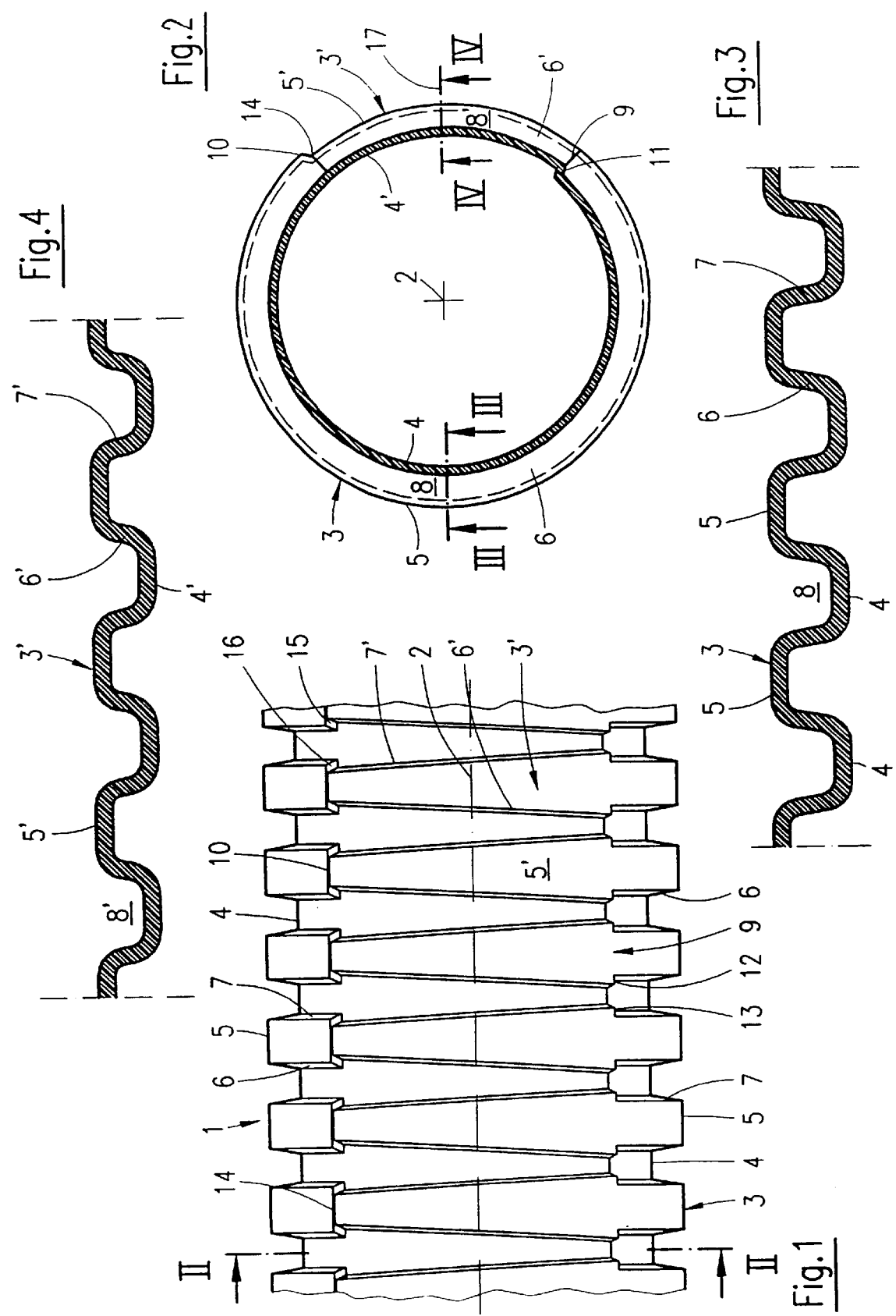

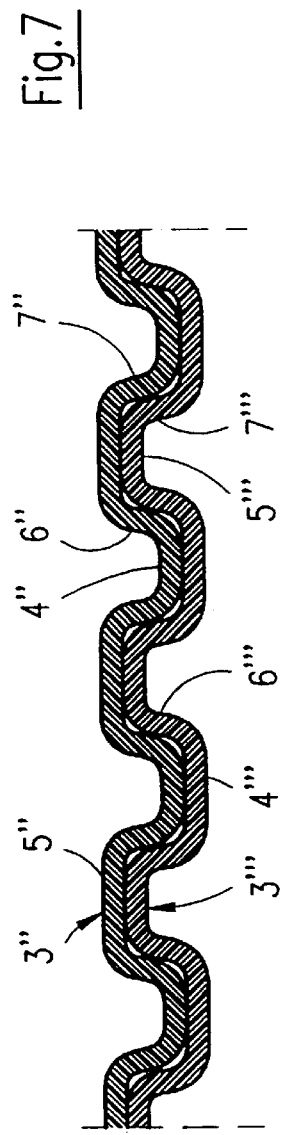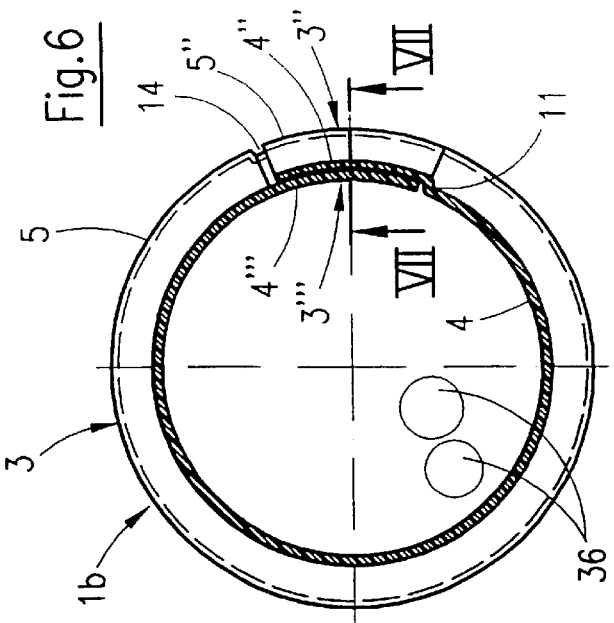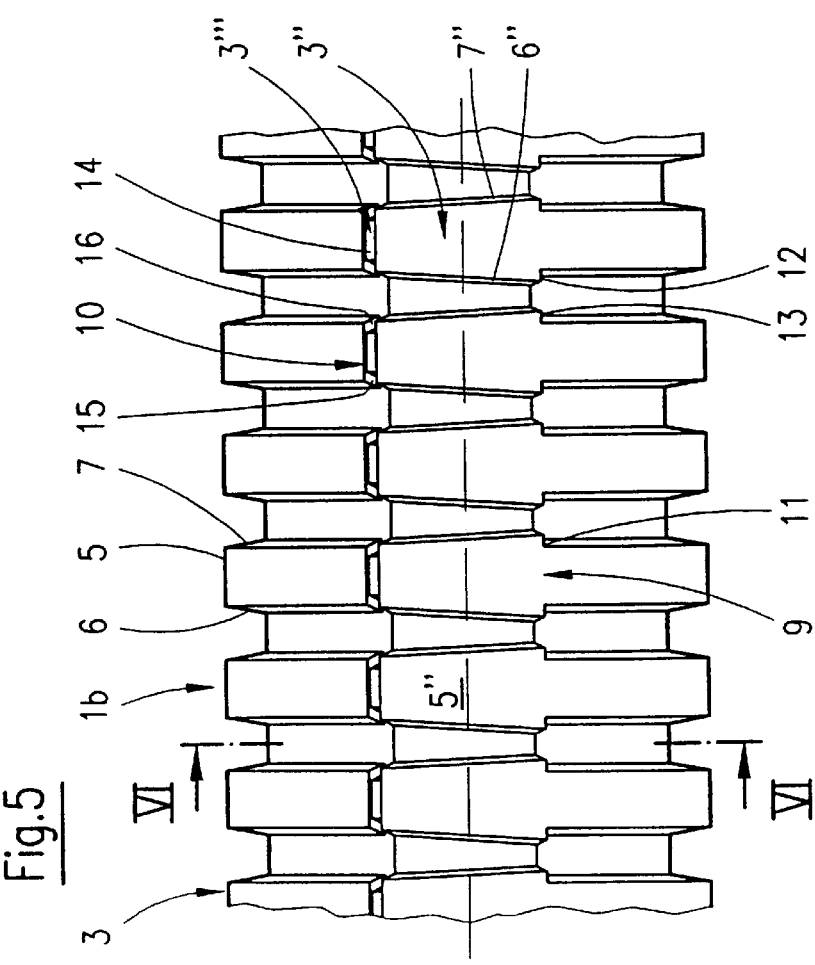

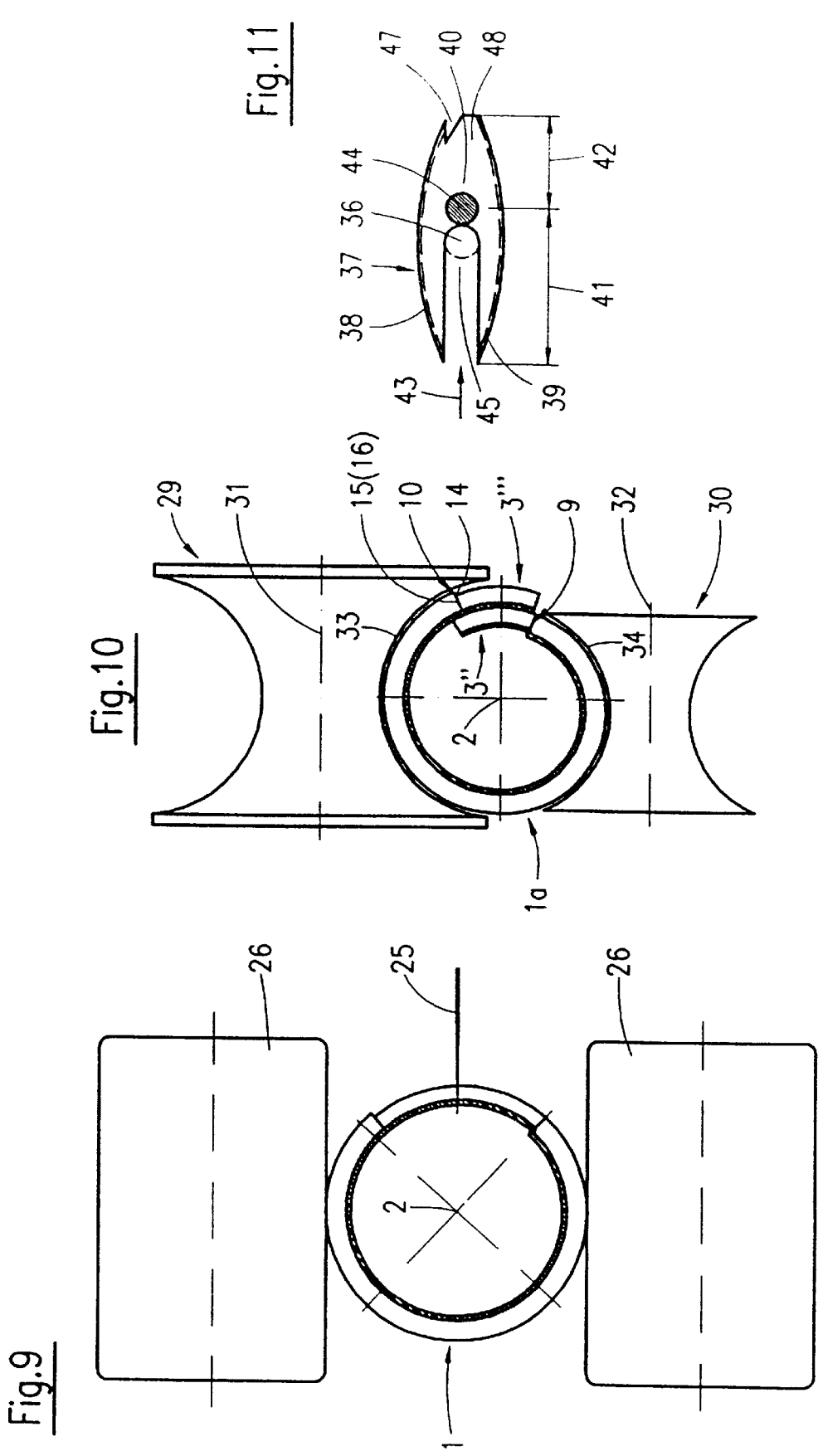

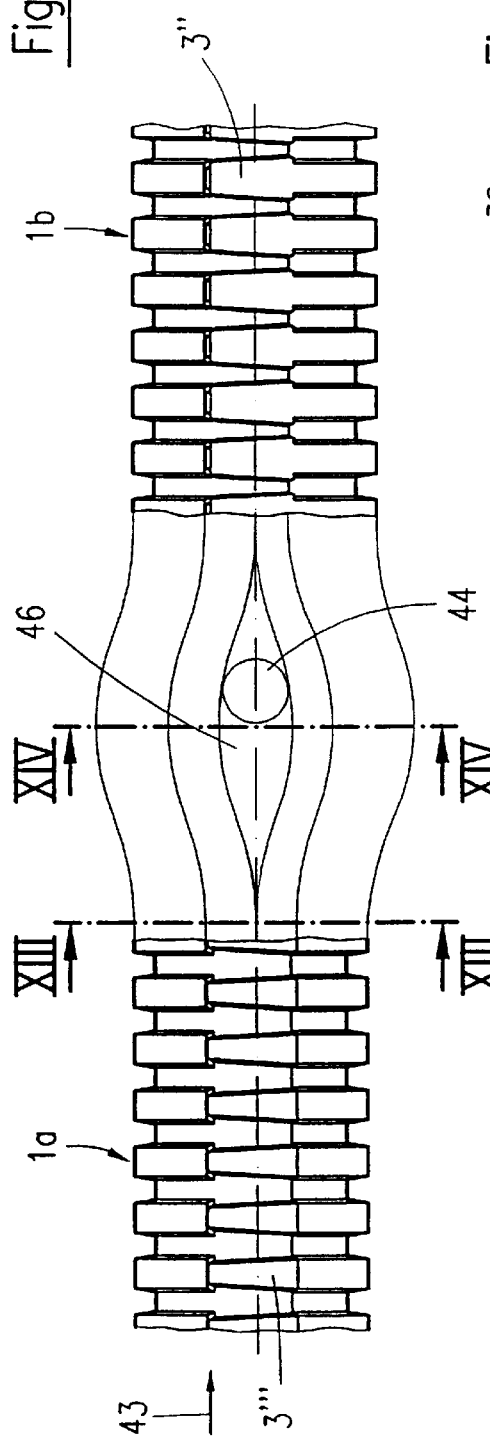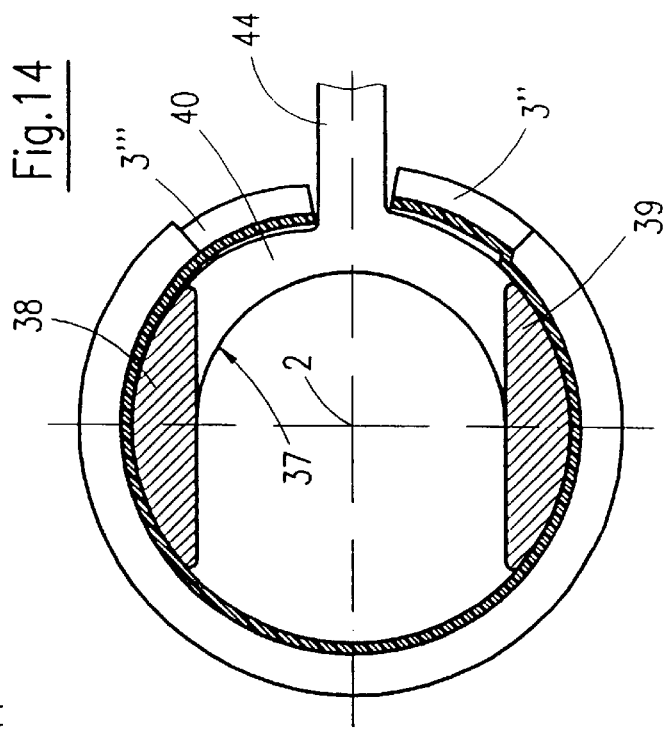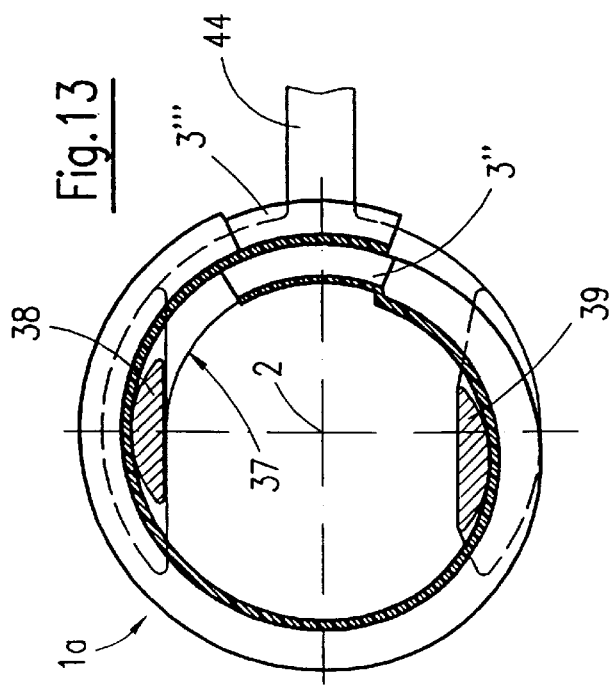

METHOD OF PRODUCING A ONE-PIECE CORRUGATED JACKET PIPE FROM THERMOPLASTIC AND METHOD OF INSERTING AT LEAST ONE ELECTRIC LINE INTO SUCH A CORRUGATED JACKET PIPE

This is a continuation of U.S. application Ser. No. 09/489,616 now abandoned filed Jan. 24, 2000.

BACKGROUND OF THE INVENTION

1. Field of the Invention

The invention relates to a method of producing a one-piece corrugated jacket pipe of thermoplastic comprising the steps of forming a thermoplastic tube; shaping the tube into a corrugated pipe, which is closed over its circumference and has an axis and a corrugated section formed by a first corrugated partial section and a second corrugated section, the partial sections being such that when radially overlapping each other, the first partial section lies radially outwards and engages with the radially inward second partial section; cutting the corrugated pipe parallel to the axis in a cutting plane for the corrugated partial sections to form; thermally deforming the corrugated pipe such that the two corrugated partial sections lie one above the other radially and lap over each other in a peripheral direction. The invention further relates to a method of inserting at least one electric line into such a corrugated jacket pipe.

2. Background Art

A method of the generic type is known from WO98/32 202. In this case, the corrugated jacket pipe is thermally formed in such a way that the first corrugated partial section rests radially outwards on, and engages with, the second corrugated partial section directly after the forming. Practice has shown that the engagement of the first and the second corrugated partial section does not take place with the required radial prestress. This may result in small gaps forming so that electric lines might get squeezed or damaged. Moreover, the corrugated jacket pipe may open when bent during installation for instance in a vehicle, and the electric lines disposed in it may come out. This too may lead to damages of the electric lines.

This also applies to the corrugated jacket pipe known from WO97/32 379.

SUMMARY OF THE INVENTION

It is an object of the invention to develop the method of the generic type so that the corrugated partial sections engage with each other by sufficiently high radial prestress after the installation of the electric lines.

In a method according to the invention, this object is attained by the first partial section and the second partial section being deformed thermally such that the first partial section lies radially inwards—related to the second partial section—and that the two partial sections lap over each other in the peripheral direction. The measures according to the invention help ensure that the first corrugated partial section, which lies radially outwards after the installation of at least one electric line and once the corrugated jacket pipe has been closed, is positioned radially inwards in the corrugated pipe prior to the installation of the electric line, this corrugated pipe constituting an intermediate product, so that after the change of the radial position of the two partial sections relative to each other, these sections bear against each other by high radial prestress in the position in which they overlap each other.

The method of how to open the corrugated pipe produced according to the invention and how to close it after the insertion of at least one electric line is characterized in that in the vicinity of the cutting plane, an aperture is formed between the corrugated partial sections by spreading them elastically in the peripheral direction; in that at least one electric line is inserted through the aperture into the corrugated pipe; and in that by closing the aperture, the first corrugated partial section is moved to lap radially outwards over the second corrugated partial section in the peripheral direction by elastic restoring forces of the corrugated pipe.

Further advantages and features of the invention will become apparent from the ensuing description of an exemplary embodiment of the invention, taken in conjunction with the drawing.

BRIEF DESCRIPTION OF THE DRAWING

FIG. 1 is a lateral longitudinal view of a corrugated pipe as a first intermediate product;

FIG. 2 is a cross section through the corrugated pipe on the section line II—II in FIG. 1;

FIG. 3 is a cross section through the corrugated pipe on the section line III—III in FIG. 2;

FIG. 4 is a cross section through the corrugated pipe on the section line IV—IV in FIG. 2;

FIG. 5 is a lateral longitudinal view of the corrugated pipe in a finished condition of assembly;

FIG. 6 is a cross section through the corrugated pipe on the section line VI—VI in FIG. 5;

FIG. 7 is a cross section through the corrugated pipe on the section line VII—VII in FIG. 6;

FIG. 9 is a section through a delivery mechanism on the line IX—IX in FIG. 8;

FIG. 10 is a section through a postforming device on the line X—X in FIG. 8;

FIG. 11 is a plan view of a mounting tool;

FIG. 12 is a plan view of the corrugated pipe with the mounting tool in use;

FIG. 13 is a section through the corrugated pipe on the line XIII—XIII in FIG. 12; and FIG. 14 is a section through the corrugated pipe on the line XIV—XIV in FIG. 12.

DESCRIPTION OF THE PREFERRED EMBODIMENT

Figure 8:
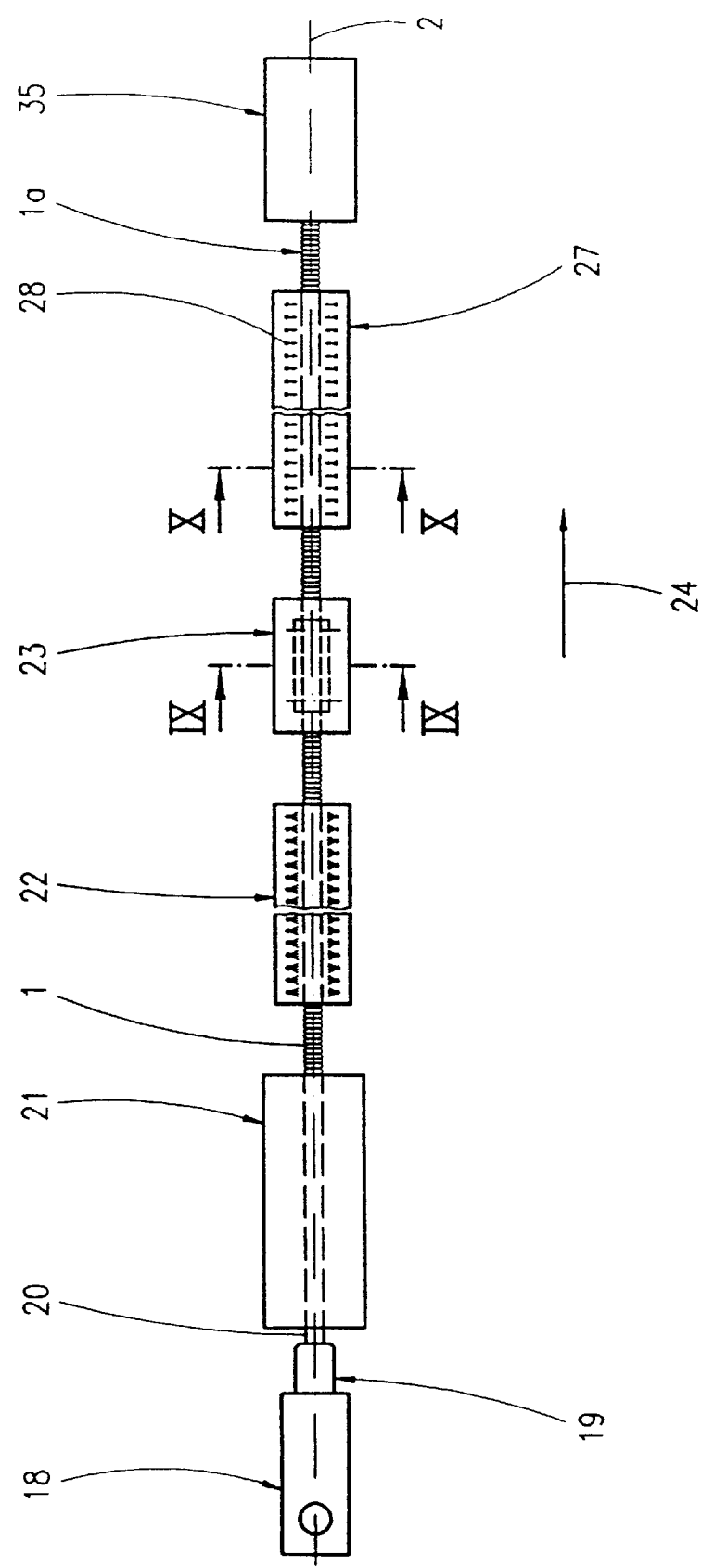
FIG. 8 is an illustration of a plant for the manufacture of a corrugated pipe according to FIGS. 1 to 7.

The corrugated pipe 1 seen in FIGS. 1 to 4, which is a first intermediate product, consists of a known thermoplastic, for instance polyethylene, polypropylene, polyamide or the like. It has a central longitudinal axis 2, concentrically of which the corrugated pipe 1 is provided with corrugated sections 3, which extend approximately over three quarters of the periphery as seen in FIG. 2. These corrugated sections 3 comprise substantially circular cylindrical inner pipe sections 4, which extend concentrically of the axis 2, and substantially circular cylindrical outer pipe portions 5, which are likewise concentric of the axis 2. An inner pipe section 4 is connected with the neighboring outer pipe portions 5 by way of flanks 6, 7. The flanks 6, 7 joined to an outer pipe portion 5 slightly incline towards each other, seen from the axis 2 radially outwards, so that a cavity 8 forms between an outer pipe portion 5 and the adjoining flanks 6, 7, the cavity 8—seen from the axis 2—standing back radially outwards relative to the inner pipe sections 4 and in cross section having approximately the shape of a trapezoid that expands towards the pipe portion 5, as seen in FIG. 3. This design of a corrugated pipe 1, seen in FIG. 2 top, bottom and left, is known and general practice.

As becomes apparent from FIGS. 1, 2, and 4, the corrugated pipe 1 comprises corrugated sections 3' over part of its periphery, which likewise have inner pipe sections 4' that continue the inner pipe sections 4 and close same over the periphery, outer pipe portions 5' that continue the outer pipe portions 5 and close same over the periphery and flanks 6' and 7' that join the inner pipe sections 4' to the outer pipe portions 5'. The cross section of the cavity 8' formed in the corrugated section 3' changes over the pheripheral extension of the corrugated section 3'.

The corrugated sections 3' have a beginning 9 seen at the lower right in FIG. 1 and in FIG. 2, which corresponds to an end of the corrugated section 3. The corrugated section 3' further comprises an end 10 seen in FIG. 1 top and at the upper right in FIG. 2, which corresponds to the other end of the corrugated section 3. At the beginning 9, the outer pipe portion 5 of a corrugated section 3 passes steadily into the outer pipe portion 5' of the corrugated section 3' as becomes apparent from FIGS. 1 and 2. As opposed to this, the inner pipe section 4' is misaligned relative the inner pipe section 4 outwards radially to the axis 2. The flanks 6' and 7' of the corrugated section 3' are displaced in the axial direction relative to the flanks 6, 7 of the adjoining corrugated section 3. The inner pipe section 4' passes into the inner pipe section 4 by way of a transition section 11; the flanks 6' and 7' pass into the flanks 6 and 7, respectively, by way of transition sections 12, 13, which extend outwards from the flanks 6 and 7 in the axial direction.

At the end 10 of the corrugated sections 3', the inner pipe section 4' thereof passes continuously into the adjoining inner pipe section 4 of the adjoining corrugated section 3, as seen in FIG. 2. As opposed to this, the outer pipe portion 5' stands back radially inwards relative to the adjoining pipe portion 5. At the end 10, the outer pipe portion 5' passes into the adjoining outer pipe portion 5 by way of a transition section 14 that extends outwards. Further, the flanks 6 and 7' pass into the flanks 6, 7 by way of transition sections 15, 16, these transition sections 15, 16 extending inwards from the flanks 6, 7 in the axial direction.

When the corrugated pipe 1 is cut up unilaterally in the middle between the beginning 9 and the end 10 of the corrugated sections 3' in a cutting plane 17 that coincides with the section line IV—IV of FIG. 2 and also runs through the axis 2, then two corrugated partial sections 3" and 3'" are formed from a corrugated section 3', the corrugated partial section 3" extending from the begin 9 to the cutting plane 17 and the corrugated partial section 3'" extending from the cutting plane 17 to the end 10. Correspondingly, the corrugated partial section 3" comprises an inner partial pipe section 4", an outer partial pipe portion 5" and partial flanks 6" and 7". The corrugated partial section 3'" correspondingly comprises an inner partial pipe section 4'", an outer partial pipe portion 5'" and partial flanks 6'" and 7'". When the corrugated pipe 1 cut through in the cutting plane 17 is bent together—as seen in FIGS. 5 to 7—then the corrugated outer partial section 3", by reason of the design specified of the corrugated sections 3', houses the corrugated inner partial section 3'41 in such a way that the inner partial pipe sections 4" and 4'", the outer partial pipe portions 5" and 5'" and the partial flanks 6" and 6'", and 7" and 7'", respectively, rest on each other as seen in FIG. 7. Further, the inner partial pipe section 4'" extends so as to pass into the adjoining inner pipe section 4 without any serious irregularity at the transition section 11. Correspondingly, the outer partial pipe portion 5" does not exhibit any serious radial irregularity towards the partial pipe portion 5 at the transition section 14. As can further be seen from FIGS. 5 and 7, the partial flanks 6" and 7" pass without irregularity into the flanks 6, 7 at the transition sections 15, 16. The same applies to the partial flanks 6'" and 7'" at the transition sections 12, 13. Further details of the corrugated pipe 1, in particular its dimensions, can be seen from WO98/32 202.

Manufacturing the corrugated pipe 1 takes place on a plant as diagrammatically illustrated in FIG. 8. Such a plant comprises an extruder 18, from the extrusion die 19 of which is extruded a tube 20 of thermoplastic.

In a downstream molding machine 21, the tube 20 is shaped into a corrugated pipe 1 by so-called vacuum treatment or by so-called blow molding or by a combined vacuum treatment and blow molding method. Molding machines 21 of the generic type are generally known from German patents 12 03 940 and 12 11 789 (corresponding to British patent 971 021). The corrugated pipe 1, which is already inherently stable, leaves the molding machine 21.

This corrugated pipe 1 is further cooled in a downstream cooling bath 22 by means of an appropriate coolant. This may be air or water. Cooling baths 22 of this type are known and general practice.

A belt or Caterpillar delivery mechanism 23 is disposed downstream of the cooling bath 22, by means of which the corrugated pipe 1 is conveyed in the direction of production 24. Belt or Caterpillar delivery mechanisms 23 of this type are also known and general practice. This delivery mechanism 23 is also provided with a cutting device, which substantially consists of a knife 25, by means of which the corrugated pipe 1 is slit lengthwise in the cutting plane 17. Since the belt and Caterpillar delivery mechanism 23 is otherwise known and general practice, the delivery belts 35 are only diagrammatically outlined.

In the direction of production 24, the delivery mechanism 23 is followed by a postforming device 36, in which heaters 28 are provided by means of which the corrugated pipe 1 is heated to a temperature appropriate for thermal postforming. Shaping rolls 29, 30 are disposed by twos in the postforming device 27, having axes 31, 32 that run at right angles to the central longitudinal axis 2 of the corrugated pipe 1. Further, they have concave surfaces 33, 34 which are arched inwards towards the respective axis 31 and 32 and by means of which the corrugated pipe 1 slit in the cutting plane 17 is deformed, losing its original form seen in FIGS. 1, 2 and 9. The concave surface 33 of the shaping roll 29 is such that it corresponds substantially to the semi-cylindrical periphery of the corrugated pipe 1. The concavity of the surface 34 of the shaping roll 30 is such that in vicinity to the partial sections 3'", the corrugated pipe 1 is bent in the direction toward the axis 2 so that the corrugated partial sections 3" are pushed under the corrugated partial sections 3'" as seen in FIG. 10. Shaping the corrugated pipe 1 to form the corrugated pipe 1a, which is a second intermediate product, can be seen in FIG. 10. In the peripheral direction, the corrugated partial sections 3" reach beyond the transition sections 14, 15, 16 at the end 10. The corrugated pipe 1a is then coiled up on a customary coiling device 35.

The finished corrugated pipe 1b as illustrated in FIGS. 5 and 6 serves as a corrugated jacket pipe for electric lines 36 or the like, some of which are illustrated in FIG. 6. The lines 36, which are to be inserted into the corrugated pipe 1a, and the plug-type connectors are pre-positioned. Then the respective corrugated pipe 1a is opened approximately radially to the axis 2 in the vicinity of the corrugated partial sections 3" and 3'" by means of a corresponding mounting tool 37 and the strand of lines 36 is inserted.

Such a mounting tool is illustrated in FIGS. 11, 13, 14. It has an approximately U-shaped cross section. On the outside, its legs 38, 39 are concave crosswise to the axis 2 as seen in FIGS. 13, 14; they are concave also in the direction of the axis 2 as seen in FIG. 11. The legs are joined to each other by means of a web 40. The mounting tool 37 has an opening section 41, from where the corrugated pipe 1a is pushed on the mounting tool 37 for being opened. The opposite end constitutes a locking section 42, by means of which the opened corrugated pipe 1a is closed, forming the corrugated pipe 1b (see FIGS. 5 and 6). The direction of mounting in which the corrugated pipe 1a is pushed on to the mounting tool 37 is mar 43 in FIGS. 11 and 12. Fixed approximately centrally on the web 40 is a handle 44 by means of which to keep the mounting wool 37 stationary or to shift it—counter to the direction of mounting 43 when the corrugated pipe 1a is kept stationary. Within the opening section 41, the holder 44 is followed by an inlet port 45 for electric lines which is open toward the end.

As can be seen from FIG. 11 in combination with FIGS. 13 and 14, the mounting tool 37 is curved in such a way that the corrugated pipe 1a, when approaching the mounting tool 37, is expanded in the opening section 41 thereof so that the corrugated partial sections 3" and 3'" are spread outwards from their position seen in FIG. 10 into their position seen in FIG. 14, in which the free ends of the corrugated partial sections 3" and 3'" are spaced from each other in the peripheral direction by a distance which is given by the thickness of the handle 44 and in which the corrugated partial section 3" lies radially further outwards than the corrugated partial section 3'" which lies inwards when the corrugated pipe 1b has its definitive shape. While the corrugated pipe 1a moves continuously over the mounting tool 37, the collected electric lines 36 are led through the inlet port 45 into the corrugated pipe, namely through the aperture 46, seen in FIG. 12, formed between the partial sections 3" and 3'" by widening the corrugated pipe 1a.

In the locking section 42, the design of the leg 38, which is allocated to the partial section 3'", is such that this corrugated partial section 3'" relaxes radially and in the peripheral direction more rapidly than the corrugated partial section 3", as a result of which the section 3" moves over the partial section 3'" as seen in particular in FIGS. 5 and 6. To this end, a recess 47 is formed between the leg 40 and the leg 38, widening in the direction of mounting 43 and allowing the partial section 3'" to relax rapidly in the radial direction while the partial section 3" is still guided on a radially projecting shoulder 48 of the mounting tool 37.

The transition from the corrugated pipe 1a, which is an intermediate product, to the corrugated pipe 1b, which has the definitive shape, is effected by the corrugated pipe being opened and closed again. The closing of the corrugated pipe after opening and the insertion of the electric lines 36 results from the elasticity of the corrugated pipe.

In the definitive shape of the corrugated pipe 1b, the two corrugated partial sections 3" and 3'" are pressed against each other radially to the axis 2 by the prestress that has been conferred to them by the deformation performed to create the corrugated pipe 1a.

What is claimed is:

1. A method of producing a one-piece corrugated jacket pipe of thermoplastic, comprising the following steps:

forming a thermoplastic tube;

shaping the tube into a corrugated pipe which is closed over its circumference and has an axis and a corrugated section;

cutting the corrugated pipe parallel to the axis in a cutting plane along said corrugated section to form a first and a second corrugated partial section;

thermally deforming the cut corrugated section such that the first and second corrugated partial sections radially and peripherally overlap each other with the first partial section laying radially outward and second partial section laying radially inward; and engaging the first partial section and second partial section by radial prestress, when the first partial section lies radially outwards and overlaps the second partial section radially and peripherally.

2. A method of inserting at least one electric line into a one-piece corrugated jacket pipe of thermoplastic produced according to the following steps:

forming a thermoplastic tube;

shaping the tube into a corrugated pipe which is closed over its circumference and has an axis and a corrugated section;

cutting the corrugated pipe parallel to the axis in a cutting plane along said corrugated section to form a first and a second corrugated partial section;

thermally deforming the cut corrugated section such that the first and second corrugated partial sections radially and peripherally overlap each other with the first partial section laying radially outward and second partial section laying radially inward;

forming in the vicinity of the cutting plane, an aperture by spreading the first and second corrugated partial sections elastically in the peripheral direction;

inserting at least one electric line through the aperture into the corrugated pipe; and wherein the aperture is closed by moving the first corrugated partial section to overlap radially outwards the second corrugated partial section in the peripheral direction by elastic restoring forces of the corrugated pipe.

* * * * *

UNITED STATES PATENT AND TRADEMARK OFFICE
CERTIFICATE OF CORRECTION

PATENT NO. : 6,323,425 B1
DATED : November 27, 2001
INVENTOR(S) : Hegler et al.

It is certified that error appears in the above-identified patent and that said Letters Patent is hereby corrected as shown below:

Column 6,
Lines 22 and 42, each occurrence, change "outward" to -- inward --
Lines 23 and 43, each occurrence, change "inward" to -- outward --

Signed and Sealed this

Twenty-second Day of June, 2004

JON W. DUDAS
*Acting Director of the United States Patent and Trademark Office*